Oct. 29, 1946.　　　C. T. MATTHEWS　　　2,410,227
CHRISTMAS TREE HOLDER
Filed June 7, 1946　　　2 Sheets-Sheet 1
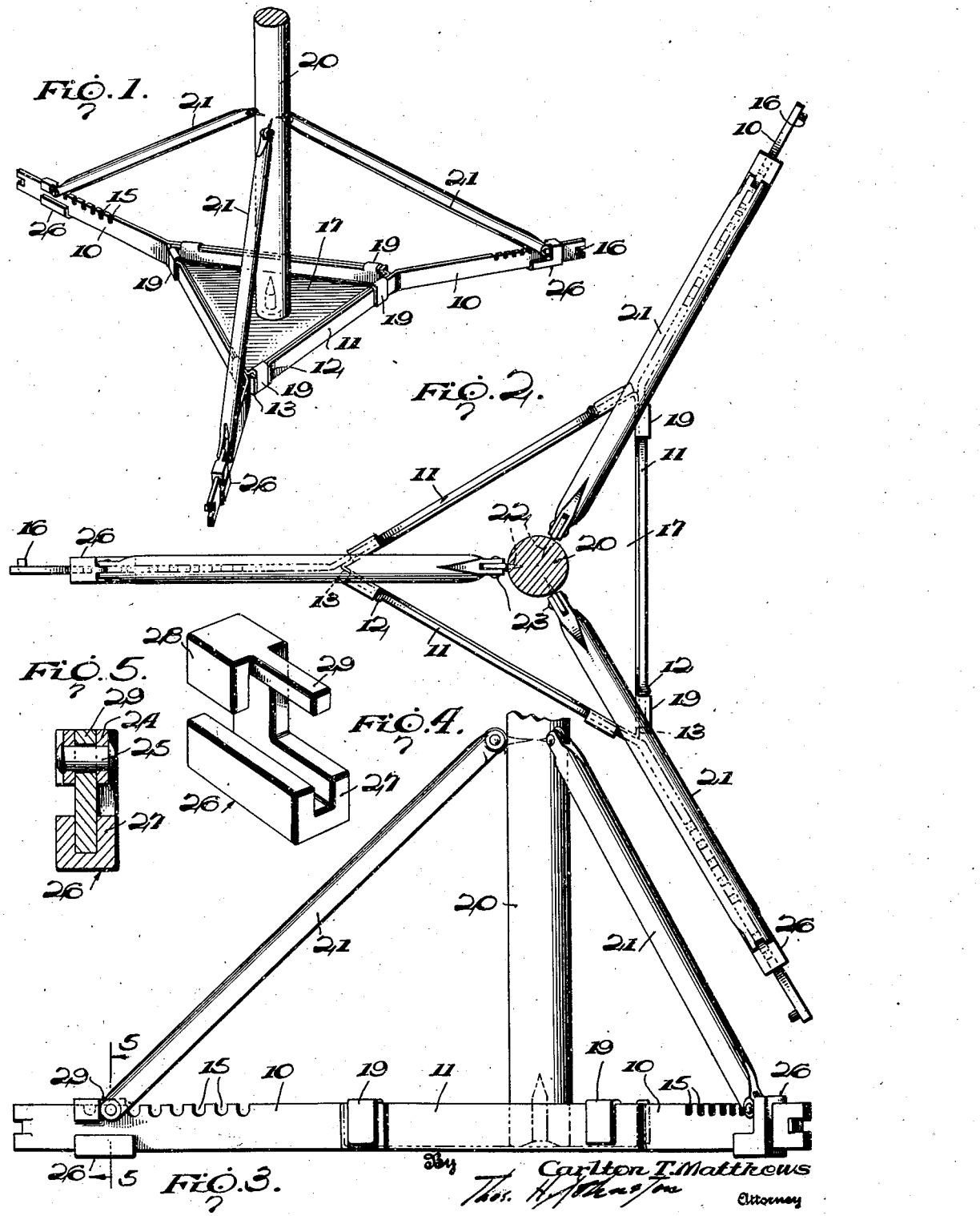

Oct. 29, 1946.   C. T. MATTHEWS   2,410,227
CHRISTMAS TREE HOLDER
Filed June 7, 1946   2 Sheets-Sheet 2
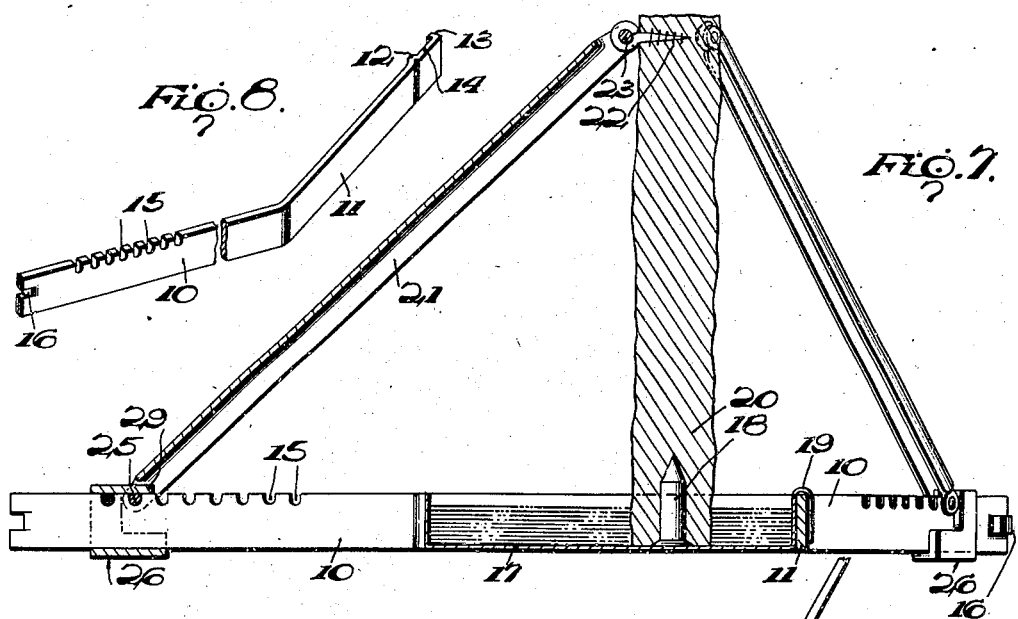
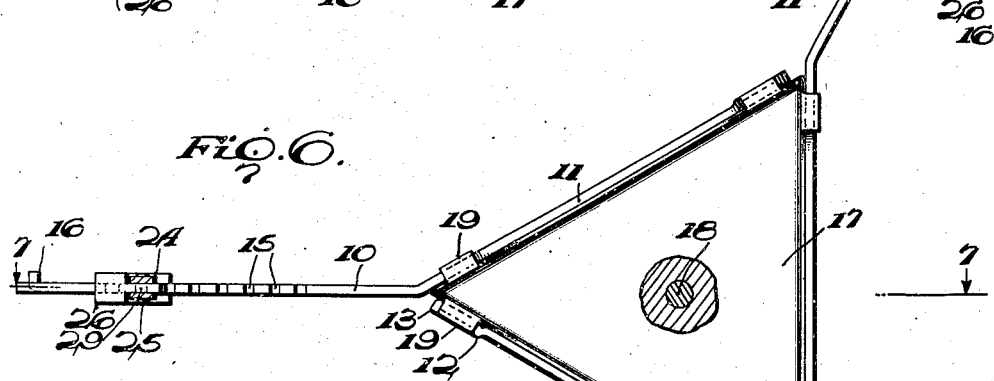
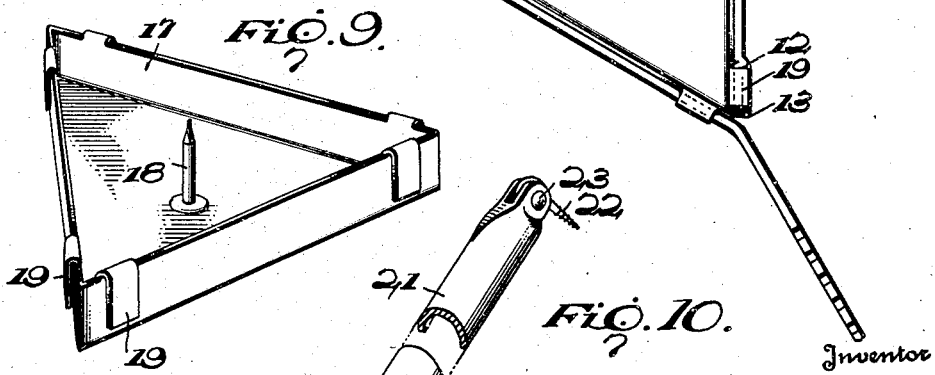
Inventor
Carlton T. Matthews Patented Oct. 29, 1946

2,410,227

UNITED STATES PATENT OFFICE 2,410,227

CHRISTMAS TREE HOLDER

Carlton T. Matthews, Green Bay, Wis.

Application June 7, 1946, Serial No. 675,168

8 Claims. (Cl. 248—48)

This invention relates to an improved Christmas tree holder, although, as will later appear, the device may be used for holding other objects erect, and I do not, therefore, wish to be limited in this respect.

Perhaps the general incentive of the invention may be stated as an object to provide a simple and inexpensive device which may be readily assembled and adjusted to support a Christmas tree in upright position while, when not in use, the major parts may be detached from each other and compactly stored by the owner for future use.

A further object of the invention is to provide a device which, when assembled, will be solid and sturdy and will rigidly support a Christmas tree in upright position.

Still another object of the invention is to provide a device which may be readily adjusted for positioning the tree vertically, and wherein the adjusting means employed may be locked in adjusted position, so that when the tree is shifted about or lifted, incident to placing the tree in a desired location, said adjusting means will not be released or displaced.

And the invention seeks, as a still further object, to provide a device embodying a pan into which water may be introduced for keeping the tree moist, and wherein the pan will normally serve to rigidly retain the base bars of the device in assembled relation with the pan.

Other and incidental objects of the invention will appear during the course of the following description, and in the drawings:

Figure 1 is a perspective view of my improved device showing a portion of the trunk of a Christmas tree in position thereon.

Figure 2 is a top plan view of the device.

Figure 3 is a side elevation.

Figure 4 is a perspective view of one of the locking keepers for the outer ends of the prop bars employed.

Figure 5 is a section on the line 5—5 of Figure 3.

Figure 6 is a detail plan view more particularly showing the water pan.

Figure 7 is a section on the line 7—7 of Figure 6.

Figure 8 is a detail perspective view of one of the base bars.

Figure 9 is a detail perspective view of the water pan.

Figure 10 is a detail perspective view of one of the prop bars.

In carrying the invention into effect, I preferably employ three base bars 10 which are identical, one of said bars being shown in detail in Figure 8 of the drawings. As will be observed, each of said bars is bent to provide an oblique inner end portion 11 pressed near its free end to provide a transverse rib 12 while at its adjacent terminal, the bar is bent to provide a flange providing a rib 13 parallel to the rib 12. An intervening seat 14 is thus defined between said ribs. At its outer end portion, the bar is provided at its upper edge with a series of longitudinally spaced notches 15, while a lateral stop lug 16 is struck from the bar at its outer end. As perhaps best seen in Figures 2 and 6 of the drawings, the oblique inner end portions 11 of the three bars 10 are adapted to mate and form a triangular frame with the outer end portions of said bars extending from the angles of said frame.

In conjunction with the base bars 10, I provide a triangular water pan 17, seen in detail in Figure 9 of the drawings. This pan is preferably formed of good stiff sheet metal so that the pan will be rigid and not liable to bend or buckle in any direction. Upstanding from the bottom wall of the pan is a centrally located spike 18, and formed on or otherwise secured to the upper margins of the side walls of the pan, a pair near each apex of the pan, are depending resilient clips 19 normally extending substantially parallel to said side walls.

Thus, as will now be apparent, the three base bars 10 may be assembled so that the oblique inner end portions 11 thereof provide, say as seen in Figure 6, a triangular frame, when the pan 17 may be positioned relative to said frame and the spring clips 19 engaged over said end portions of the bars. As will be observed, corresponding clips of each pair of clips near the angles of the pan are engaged in the seats 14 of the inner end portions of the bars so that the bars are thus locked against endwise movement, while opposite corresponding clips of each of said pairs of clips are engaged over said inner end portions of the bars near the angles thereof. The bars 10 are thus locked to the pan and the four parts, comprising the pan and the three base bars, rigidly held in assembled relation by the pan. It should be noted that the clips 19 are sturdy and strongly resilient, and tightly clamp the inner end portions 11 of the bars against the side walls of the pan 17 to provide a rigid structure. However, the parts may, when so desired, be readily detached from each other, as will be appreciated.

In the drawings, I have conventionally shown the trunk 20 of a Christmas tree impaled at its lower end over the spike 18. The lower end of said trunk will thus be held fixed within the pan 17 and prevented from shifting about therein.

I further provide three prop bars 21 to coact with the three base bars 10, one of said prop bars being shown in detail in Figure 10 of the drawings. The prop bars are identical and may, as shown, be arcuate in cross section. Each of the prop bars 21 is forked at its upper end, and pivoted between the forks thereof is a screw eye 22 permanently secured by a rivet 23. At its lower end, the bar is likewise provided with forks 24, and extending between said forks is a permanently mounted pin 25.

In use, the screw eyes 22 of the prop bars 21 are, by rotating said bars, engaged in the trunk 20 of the Christmas tree at suitable points above the pan 17 and substantially in the several planes of the outer end portions of the base bars 10, when the pins 25 are engaged each in one of the notches 15 of said base bars. Thus, as will be at once appreciated, the lower ends of the prop bars 21 may be adjusted along the outer end portions of the base bars 10 for tilting the Christmas tree in a desired direction and finally supporting it in upright position.

Slidable along the outer end portions of the base bars 10 are locking keepers 26 for the pins 25 of the prop bars 21. As seen in detail in Figure 4, these keepers are each preferably formed of a piece of sheet metal bent into substantially rectangular shape. A long channel 27 is thus provided at the bottom of the keeper while, forwardly of the keeper above said channel, the metal is cut away to define a short upper channel 28 separated at its free end from the bottom channel. Projecting forwardly from the upper channel, parallel to the bottom channel, is a medial tongue 29 left remaining after the undesired metal of the upper channel is removed.

As perhaps best seen in Figure 5, the channels 27 of the keepers 26 embrace the lower edge margins of the outer end portions of the bars 10, while the channels 28 embrace the upper edge margins of said portions of the bars. The tongues 29 are thus disposed over but close to the upper edges of the outer end portions of the bars to extend over the pins 25 of the prop bars 21 engaged in chosen notches 15 of the base bars, clearance for the forks 24 of the prop bars being provided, as seen in Figure 6, by the shortening of the upper channels 28, as previously described. Accordingly, should the Christmas tree be lifted slightly or moved about, incident to the placing thereof, the lower ends of the prop bars 21 will not become detached from the bars 10, while displacement of the keepers 26 from the bars 10 will be prevented by the stop lugs 16. Accidental loss of said keepers will thus be obviated.

In view of the foregoing, very little need be said regarding the separation of the parts from each other and packaging for future use. As will be apparent, the base bars 10 may be detached from the pan 17. Likewise, the prop bars 21 may be detached from the trunk 20 of the Christmas tree and from the base bars. The whole device may thus be compactly stored.

Having thus described my invention, I claim:

1. A tree holder including companion base bars having angularly disposed inner end portions adapted to mate and form a frame, a pan fitting in said frame and having resilient means thereon slidably engaged with the inner end portions of said bars and clamping the bars in assembled relation with the pan, said pan being adapted to receive the lower end of the trunk of a tree, and means extending between the tree trunk and the outer end portions of said bars bracing the tree in upright position.

2. A tree holder including companion base bars having angularly disposed inner end portions adapted to mate and form a frame, a pan fitting in said frame and having resilient means thereon slidably engaged with the inner end portions of said bars and clamping the bars in assembled relation with the pan, means on the inner end portions of the bars coacting with certain of said means on the pan locking the bars against endwise movement, said pan being adapted to receive the lower end of the trunk of a tree, and means extending between the tree trunk and the outer end portions of said bars bracing the tree in upright position.

3. A tree holder including companion base bars having angularly disposed inner end portions adapted to mate and form a frame, a pan fitting in said frame and having side walls provided with resilient clips thereon slidably engaged over the inner end portions of said bars and clamping the bars in assembled relation with the pan, said pan being adapted to receive the lower end of the trunk of a tree, and means extending between the tree trunk and the outer end portions of said bars bracing the tree in upright position.

4. A tree holder including companion base bars having angularly disposed inner end portions adapted to mate and form a frame, a pan fitting in said frame and having side walls provided with resilient clips thereon slidably engaged over the inner end portions of said bars and clamping the bars in assembled relation with the pan, seats formed on the inner end portions of the bars receiving certain of said clips therein locking the bars against endwise movement, said pan being adapted to receive the lower end of the trunk of a tree, and means extending between the tree trunk and the outer end portions of said bars bracing the tree in upright position.

5. A tree holder including companion base bars having angularly disposed inner end portions adapted to mate and form a substantially triangular frame, a substantially triangular pan fitting in said frame and having side walls provided near the angles of the pan with overhanging depending spring clips slidably engaged over the inner end portions of the base bars and clamping the bars in assembled relation with the pan, pairs of spaced ribs formed on the inner end portions of the bars and receiving certain of said clips therebetween locking the bars against endwise movement, said pan being adapted to receive the lower end of the trunk of a tree, and means extending between the tree trunk and the outer end portions of said bars bracing the tree in upright position.

6. A tree holder including companion base bars, a pan having means thereon connecting the inner end portions of said bars with each other, said pan being adapted to receive the lower end of the trunk of a tree, prop bars having means at their upper ends to engage the tree trunk and means at their lower ends to engage the outer end portions of the base bars bracing the tree in upright position, and means slidable upon the outer end portions of the base bars and movable to coact with said means at the lower ends of the prop bars locking the prop bars against separation from the base bars.

7. A tree holder including companion base bars, a pan having means thereon connecting the inner end portions of said base bars with each other, said pan being adapted to receive the lower end of the trunk of a tree, prop bars having means at their upper ends to engage the tree trunk and means at their lower ends to engage the outer end portions of the base bars bracing the tree in upright position, and locking keepers slidable upon the outer end portions of the base bars and provided with tongues engageable over said means at the lower ends of the prop bars locking the prop bars against separation from the base bars.

8. A tree holder including companion base bars provided at their outer end portions with longitudinally spaced notches, a pan having means thereon connecting the inner end portions of the bars with each other, said pan being adapted to receive the lower end of the trunk of a tree, prop bars having means at their upper ends to engage the tree trunk, pins carried by the lower ends of the prop bars and selectively engageable in said notches adjustably bracing the trunk of the tree in upright position, and keepers having upper and lower channels slidably embracing the outer end portions of the base bars and provided upon the upper channels thereof with tongues engageable over said pins locking the lower ends of the prop bars in adjusted position.

CARLTON T. MATTHEWS.